United States Patent [19]

Allan et al.

[11] Patent Number: 4,685,944
[45] Date of Patent: Aug. 11, 1987

[54] HIGH EFFICIENCY PARTICULATE AIR FILTER

[75] Inventors: Thomas T. Allan; Robert V. Cramer, both of Washington, N.C.

[73] Assignee: Flanders Filters, Inc., Washington, N.C.

[21] Appl. No.: 386,653

[22] Filed: Jun. 9, 1982

[51] Int. Cl.[4] .............................................. B01D 46/52
[52] U.S. Cl. ........................................ 55/491; 55/497; 55/500; 55/502; 55/503; 55/511; 55/521; 55/DIG. 31
[58] Field of Search ................. 55/491, 497, 499, 500, 55/502, 521, DIG. 31, DIG. 9, 503, 511, 501

[56] References Cited

U.S. PATENT DOCUMENTS

| | | | |
|---|---|---|---|
| 2,032,262 | 2/1936 | Cori | 55/497 |
| 2,459,802 | 1/1949 | Fleisher | 55/491 X |
| 2,980,208 | 4/1961 | Neumann | |
| 3,183,286 | 5/1965 | Harms | 55/497 X |
| 3,235,633 | 2/1966 | Holloway et al. | 55/502 X |
| 3,280,541 | 10/1966 | Soltis | 55/502 X |
| 3,293,830 | 12/1966 | McKinlay | 55/502 X |
| 3,383,839 | 5/1968 | Hintermaier | 55/503 X |
| 3,389,031 | 6/1968 | Rosaen et al. | 55/499 X |
| 3,408,438 | 10/1968 | Staunton | 55/497 X |
| 3,490,211 | 1/1970 | Cartier | 55/497 X |
| 3,494,113 | 2/1970 | Kinney | 55/497 X |
| 3,659,719 | 5/1972 | Westlin et al. | 55/497 X |
| 3,772,857 | 11/1973 | Jackson et al. | 55/503 X |
| 3,757,499 | 9/1973 | Scott | 55/500 |
| 3,828,530 | 8/1974 | Peters | 55/502 X |
| 3,830,045 | 8/1974 | Copenhefer | 55/511 X |
| 4,102,792 | 7/1978 | Harris | 55/521 X |
| 4,227,953 | 10/1980 | Wasielewski et al. | 55/497 X |
| 4,233,044 | 11/1980 | Allan | 55/502 X |
| 4,372,853 | 2/1983 | Mayfield | 55/505 X |

FOREIGN PATENT DOCUMENTS 781194  8/1957  United Kingdom ................. 55/499

OTHER PUBLICATIONS

"The Amazing Story of the Absolute Filter", Bulletin 104C, Cambridge Filter Corp., Syracuse, N.Y., 1963.

*Primary Examiner*—Kathleen J. Prunner
*Attorney, Agent, or Firm*—Bell, Seltzer, Park & Gibson

[57] ABSTRACT

A high efficiency particulate air filter, and a method of fabricating the same, are disclosed, with the filter being characterized by being lightweight and readily disposable after use. Further, the filter may be fabricated in a basic or universal form, which permits it to be utilized to form any one of a number of possible specific mounting configurations by the placement of one or more specifically designed headers about the outer periphery. The filter comprises a sheet of HEPA filtering media folded upon itself in accordion fashion to form a filter pack, and a relatively thin and lightweight peripheral frame surrounding and supporting the pack. The frame is composed of a relatively hard, crust-like, air impermeable molded material which is self-bonded and sealed to the filter pack to effectively preclude the leakage of air therebetween. Internal integral reinforcing ribs are formed in the material of the frame along at least two opposite sides of the pack, to provide sufficient strength to permit the filter to be mounted against a pressure seal or the like.

7 Claims, 25 Drawing Figures

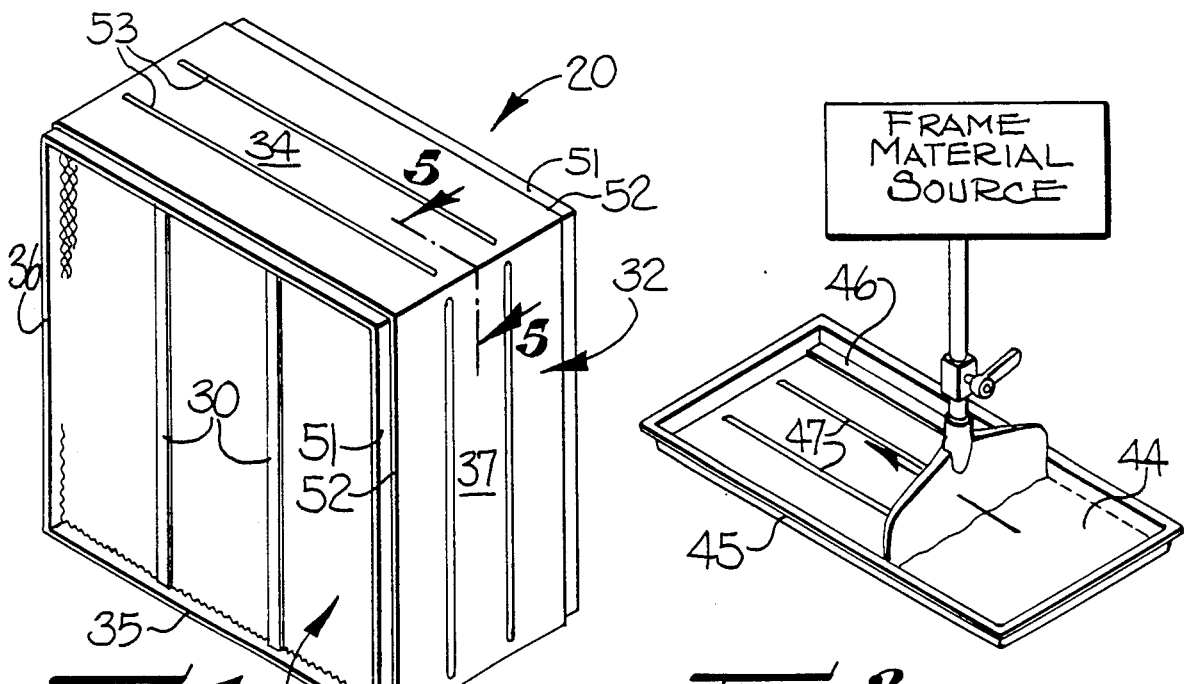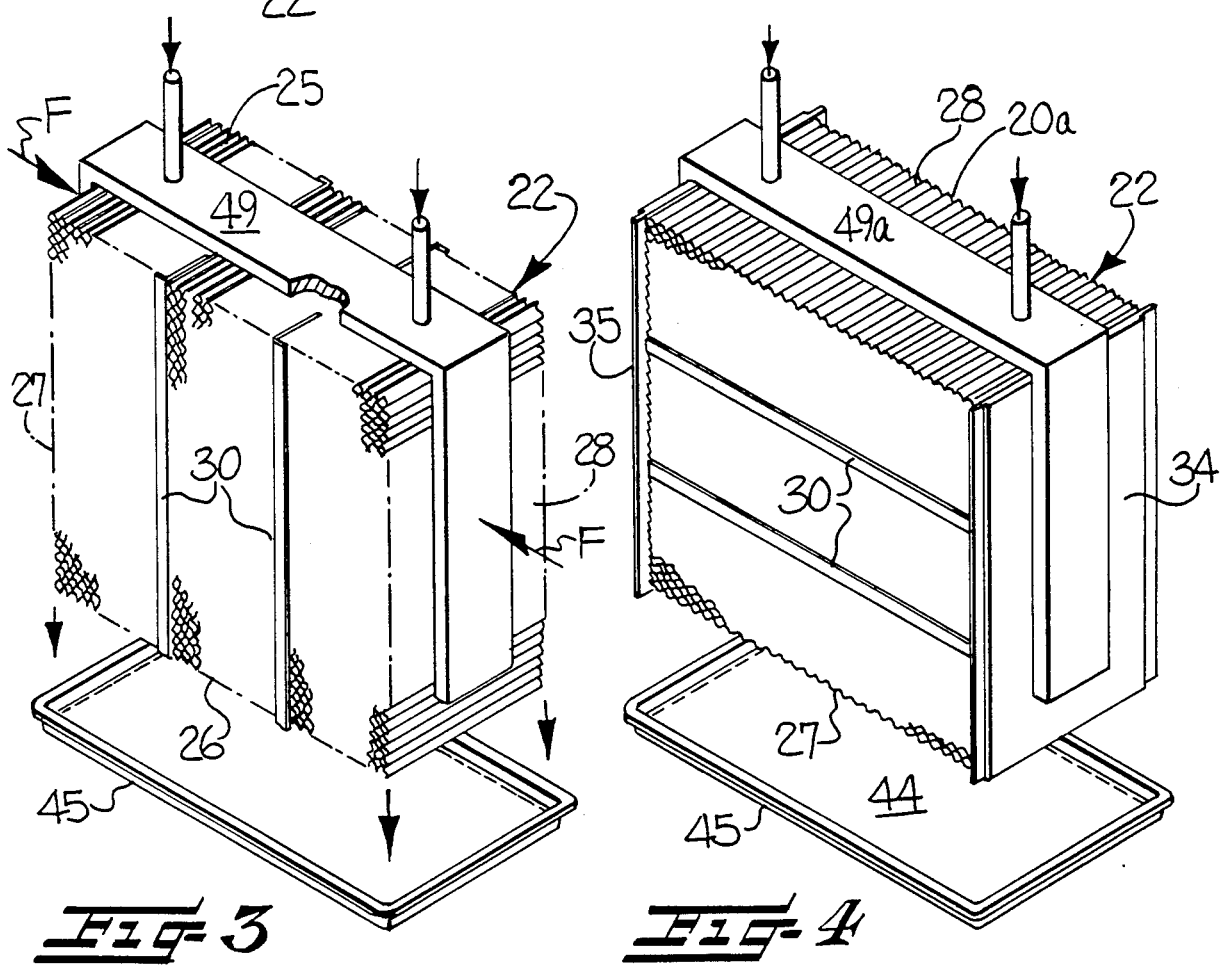

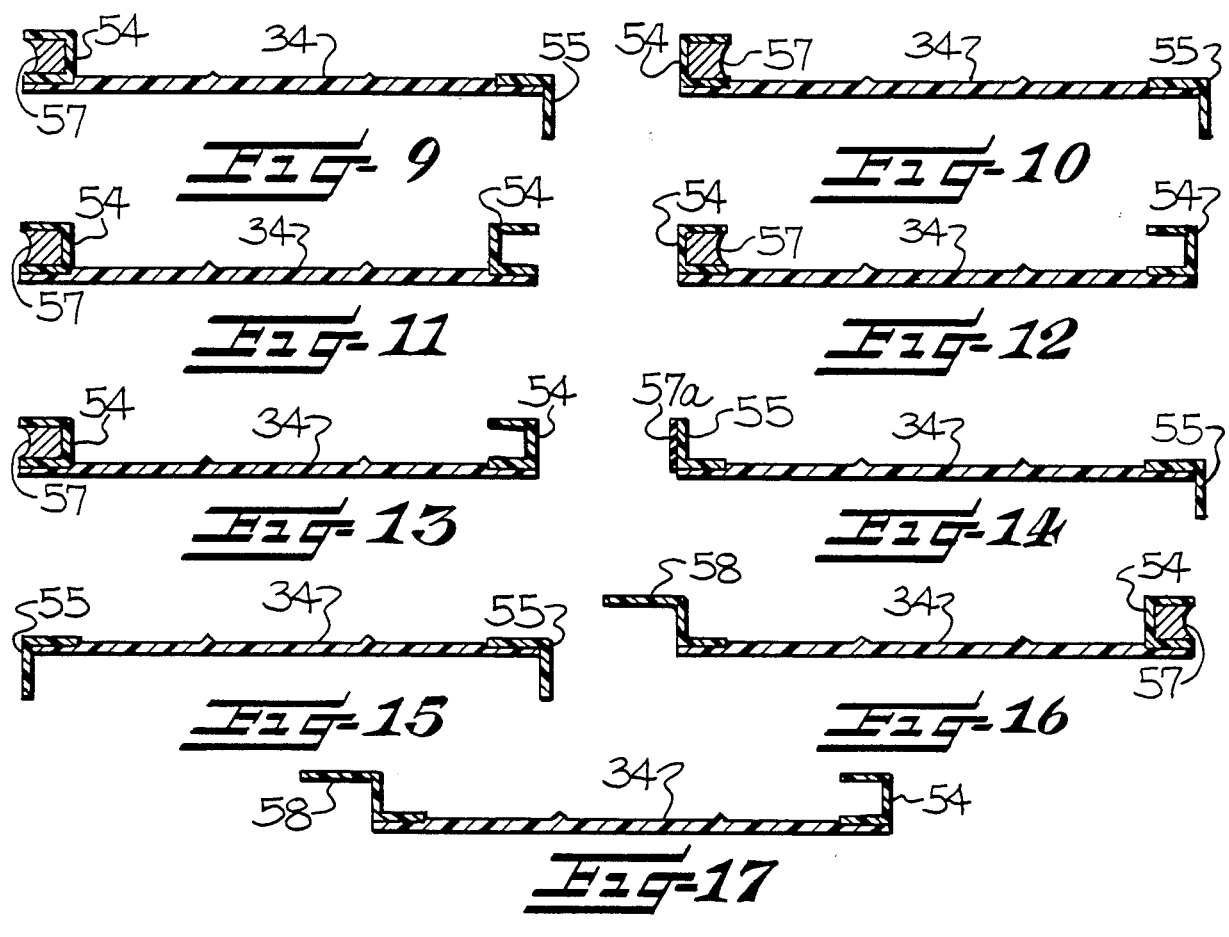
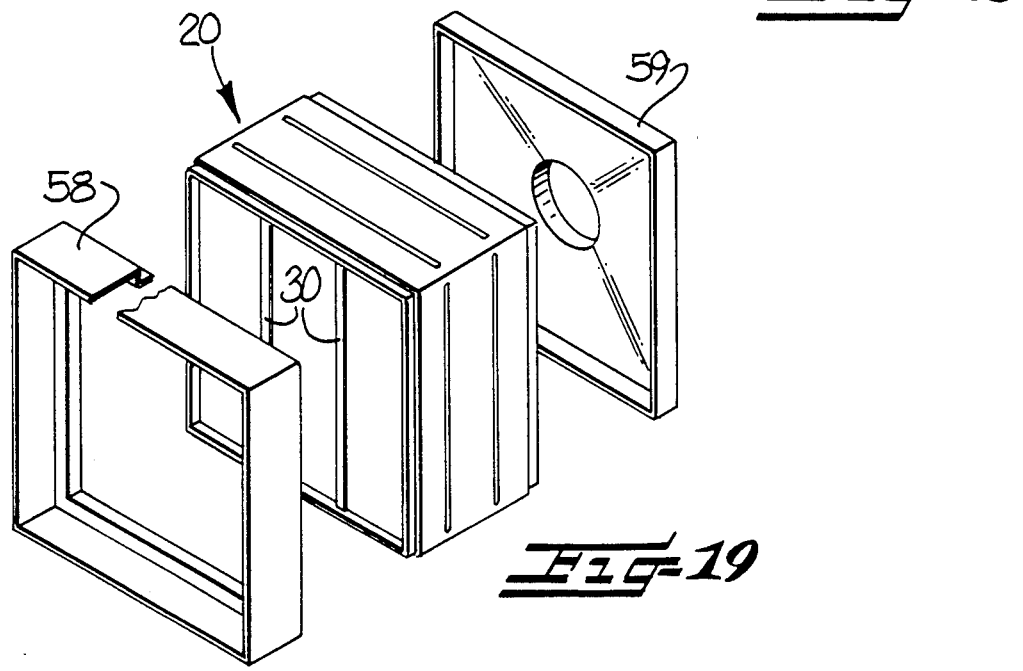

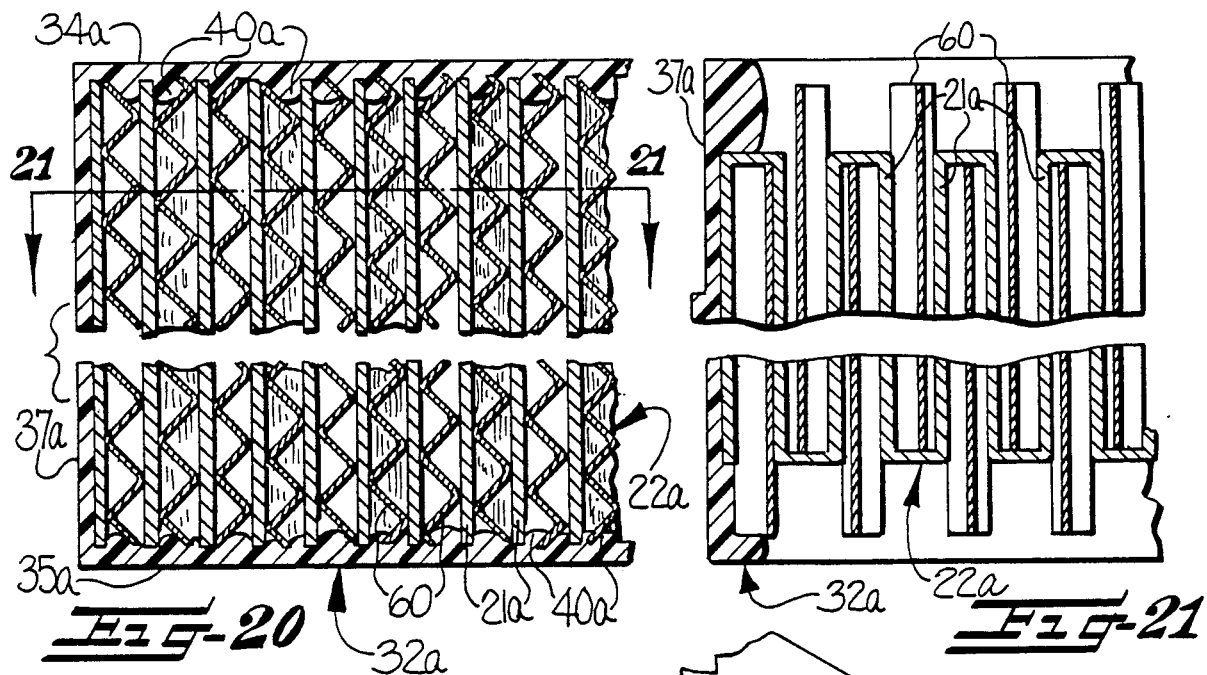
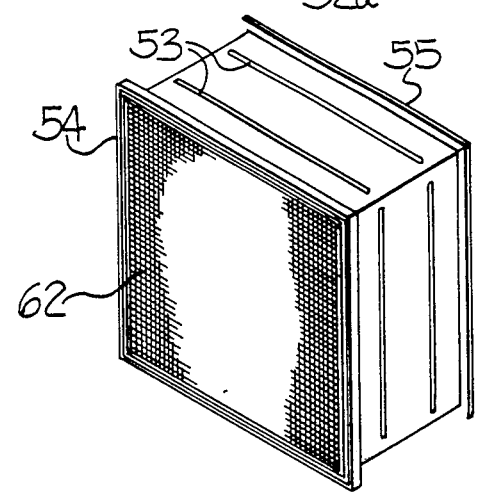
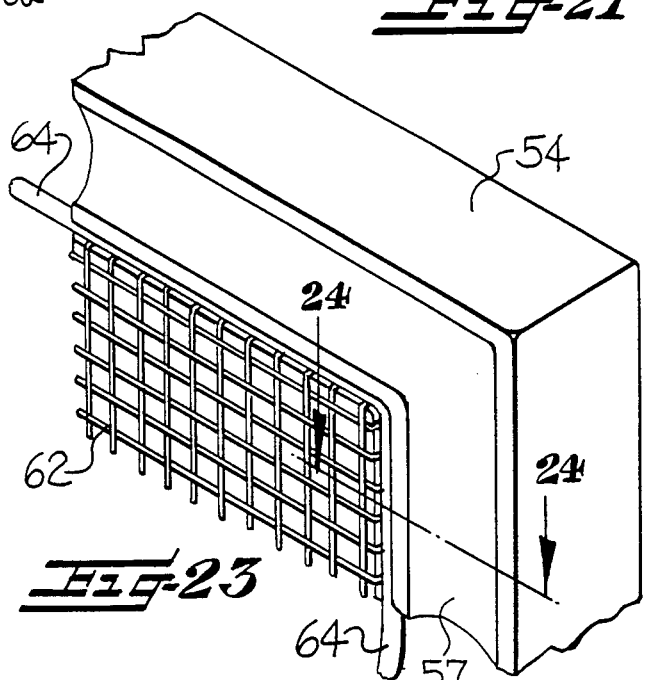
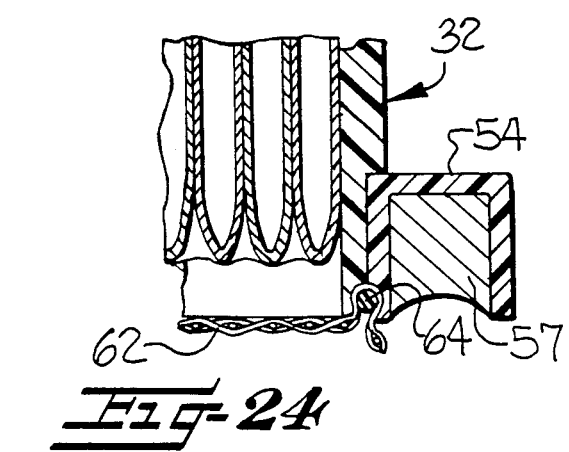
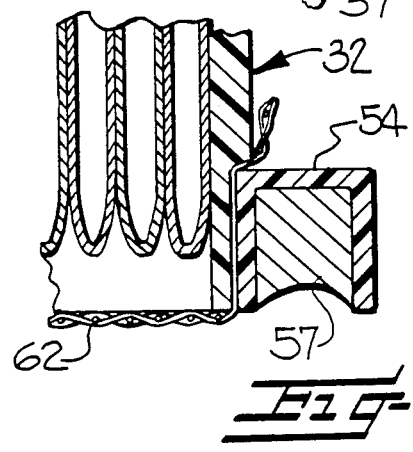

HIGH EFFICIENCY PARTICULATE AIR FILTER

The present invention relates to a novel high efficiency particulate air filter of the type presently used to supply virtually particle free air to sensitive laboratory or production areas, and also for the removal and containment of hazardous materials, such as potentially radioactive or biologically hazardous materials, from contaminated air before it is exhausted to the atmosphere. Filters of this type are commonly referred to as high efficiency particulate air (HEPA) or "absolute" filters in the industry, and they typically have the ability to remove a minimum of 99.97% of the particles having a size of 0.3 microns or greater.

A significant problem associated with filters used for the removal and containment of potentially hazardous materials, relates to the disposal of used filters. In this regard, both the size and construction of HEPA filters inhibit efficient handling and disposal. For example, the standard filter measures 24×24×11 ½ inches, and it includes a relatively heavy and rigid wooden or metal frame which is necessary to prevent "racking" of the frame and the rupture of the seal between the filtering medium and the frame. Thus, such filters are not only bulky in size, but they are also heavy, usually weighing between thirty-five to eighty-five pounds, and they are not readily crushable or compactable. At the present time, it is common to dispose of such filters by sealing each filter in a separate large steel drum, and then depositing the drums in a radioactive waste disposal site. When one considers the number of nuclear power generating stations, nuclear research laboratories, nuclear weapons facilities, biological laboratories, and the like, the magnitude of the disposal problem becomes apparent.

A further problem associated with present HEPA filters relates to the fact that present methods of manufacture are slow, labor intensive, and thus expensive. In this regard, HEPA filters are usually fabricated by initially folding a sheet of filtering medium in accordion fashion to form a rectangular pack, and then "building" a rigid frame about the four edges of the pack by separately adhering each of four separate sides of the frame to the edges of the pack in a sequential manner. The adhesive utilized to adhere the frame to the filter pack also serves as a sealant between the medium and frame. Since the two opposite edges of the pack which are defined by the cut edges of the medium, require a substantial depth of the adhesive to insure a proper seal, it is conventional to adhere these two edges by first forming a rectangular dam on one face of a frame side, then positioning the side on a horizontal surface and filling the area within the dam with the adhesive, and then depositing the pack in the area within the dam with one of the cut edges immersed in the adhesive. After the adhesive has hardened, the process is repeated for the opposite cut edge of the pack. The remaining two edges of the pack, which include the flap ends of the medium, may be adhered to the associated frame sides in the same manner, or by simply applying the adhesive to the flap ends and then holding the frame sides thereagainst until the adhesive hardens. As will be apparent, this process is very laborious and time consuming, it requires the use of substantial amounts of an adhesive, and it is difficult to achieve a consistently effective seal between the medium and frame in commercial production by reason of the numerous manual operations which are involved.

The fact that HEPA filters are presently manufactured and sold in literally thousands of different configurations, involving different hardware, media, separators, frame materials, frame styles, and sealants, creates still further manufacturing and production difficulties. Specifically, the many different configurations render it nearly impossible to keep filters in inventory at the factory or at remote distribution locations, and it is usually necessary that the filters be manufactured after a specific order is received. Thus large standardized production runs are usually not possible, which increases the cost of manufacture, and prompt delivery is not always possible by reason of possible production scheduling delays.

It is accordingly an object of the present invention to provide a high efficiency particulate air filter, and a method of manufacturing the same, which substantially alleviate the above problems associated with conventional HEPA filters.

It is a more particular object of the present invention to provide a high efficiency particulate air filter which is characterized by being lightweight, and readily disposable after use.

It is also an object of the present invention to provide a greatly simplified manufacturing process for high efficiency particulate air filters, and which eliminates the need for a separate adhesive for sealably securing the medium to the frame.

It is still another object of the present invention to provide a universal filter assembly, which is adapted to serve as a standarized cartridge which may be manufactured and stored in large quantities, and then completed as orders are received to form any one of a number of specific final configurations.

These and other objects and advantages of the present invention are achieved in the embodiments illustrated herein by the provision of a high efficiency particulate air filter which comprises a sheet of filtering medium folded upon itself in accordion fashion to form a filter pack, and a relatively thin and lightweight peripheral frame surrounding and supporting the pack, with the frame being composed of a relatively hard, air impermeable material, such as molded plastic or fiberglass, which is self-bonded to the filter medium over substantially the entire interfacing area to effectively preclude the leakage of air therebetween. The filter as described above constitutes a basic or universal cartridge, which may be manufactured in large numbers, held in inventory, and subsequently formed into a desired specific mounting configuration by the placement of any one of a number of differently designed headers about the outer periphery thereof, and as orders are received. The header may mount a sealing medium for sealably engaging a mating component in a filter housing or the like, and it also acts to gird the frame and prevent the outward bulging of the thin frame.

In one preferred embodiment of the invention, the filter is fabricated using a sheet of filtering medium having longitudinal corrugations throughout the area thereof. The sheet of filtering medium is folded upon itself in accordion fashion to form a generally rectangular filter pack of generally parallel layers, and with the corrugations of adjacent layers being generally aligned in a mirror image with respect to each other. A moldable plastic or fiberglass liquid is then provided, which is deposited in a thin layer in a generally flat, rectangular mold which is sized to generally conform to the rectangular outline of the edges of the filter pack. The pack is then positioned in the mold so that one edge thereof is immersed in the liquid, and upon setting, the liquid forms a relatively hard, crust-like, air impermeable frame side which is self-bonded and sealed to such one edge of the pack. The process is sequentially repeated for each of the three remaining edges of the pack, to thereby form a continuous relatively thin peripheral frame which is self-bonded and sealed to the filter medium about the entire periphery of the pack. As indicated above, at least one continuous header may then be mounted about the outside periphery of the frame and sealably secured to the exterior surface thereof. It is also preferred that the molding steps be conducted such that the moldable liquid is caused to flow between the adjacent spaced apart portions of the adjacent folded layers of the medium on the two opposite edges of the pack which consist of the cut edges of the filtering medium sheet, and to flow into the corrugations on the two opposite end edges of the pack, to thereby form integral reinforcing ribs on each of the frame sides and so as to impart substantial strength along the direction thereof.

Some of the objects having been stated, other objects will appear as the description proceeds, when taken in connection with the accompanying drawings in which—

FIG. 1 is a perspective view of a high efficiency particulate air filter embodying the features of the present invention;

FIG. 2 is a schematic perspective view illustrating one of the initial steps in the method of fabricating the filter shown in FIG. 1;

FIG. 3 is a schematic perspective view of a subsequent step in the method of fabricating the filter of FIG. 1;

FIG. 4 is a schematic perspective view of a still later step in the method of fabricating the filter of FIG. 1;

FIGS. 9-18 are views generally similar to FIG. 8, and illustrating different header configurations;

FIG. 19 is a perspective view of the filter of FIG. 1, with a header positioned about the frame at each end thereof, and with one of the headers comprising a transition to a cylindrical duct;

FIG. 20 is a view generally similar to FIG. 5, and illustrating a different filter construction which embodies the present invention and which includes corrugated separators between the folded layers of the filtering medium in the pack;

FIG. 21 is a sectional view taken substantially along the line 21—21 of FIG. 20;

FIG. 22 is a perspective view of a filter embodying the present invention, and which further includes a protective fabric scrim positioned to overlie one face of the filter;

FIG. 23 is a fragmentary perspective view illustrating a portion of the filter shown in FIG. 22;

FIG. 24 is a sectional view taken substantially along the line 24—24 of FIG. 23; and FIG. 25 is a view similar to FIG. 24, but illustrating a different method for attaching the scrim to the frame of the filter.

Figure 5:
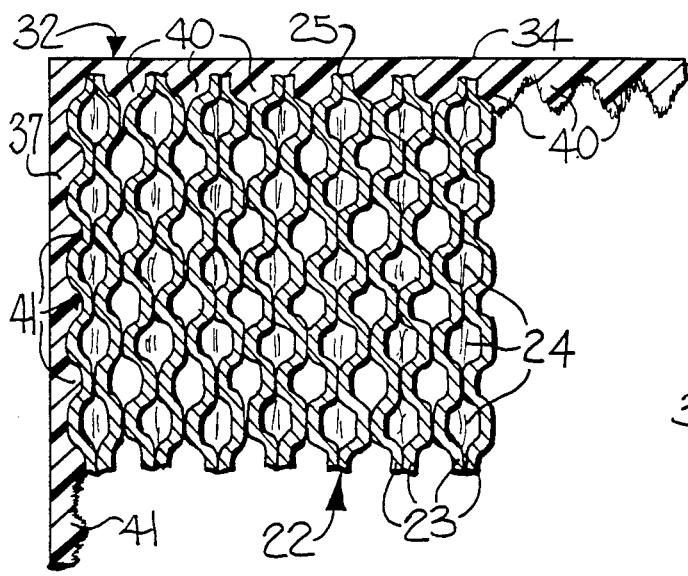
FIG. 5 is an enlarged fragmentary sectional view of the filter shown in FIG. 1, and taken substantially along the line 5—5 thereof.
Figure 6:
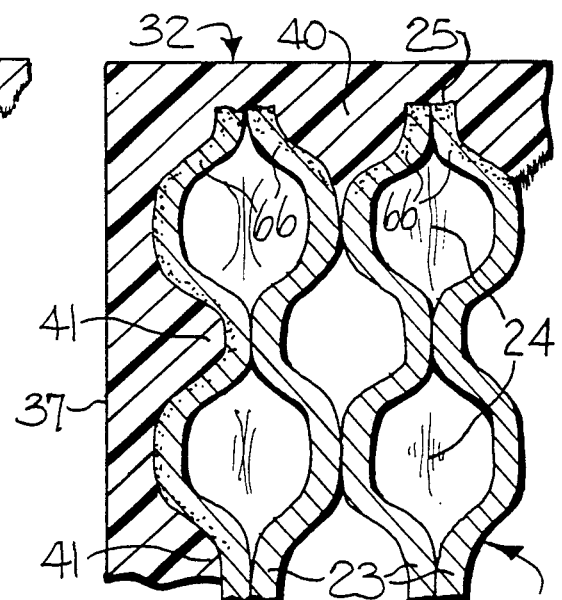
FIG. 6 is an enlarged view of a portion of FIG. 5.

Referring more particularly to the drawings, FIG. 1 illustrates a filter 20 embodying the features of the present invention, and FIGS. 2-4 schematically illustrate representative steps of a method of fabricating the filter in accordance with the present invention. The filter 20 comprises a sheet of high efficiency particulate air filtering medium which is folded upon itself in accordion fashion to form a generally rectangular filter pack 22 composed of generally parallel layers 23, with adjacent layers being interconnected by transverse fold lines 24 as best seen in FIGS. 5 and 6, and with the layers extending in the vertical direction as seen in FIGS. 1, 3 and 5. The pack 22 thus includes opposite side edges 25, 26 defined by the edges of the folded sheet, and opposite end edges 27, 28 defined by the ends of the sheet. In addition, the illustrated sheet of filtering medium includes longitudinal corrugations throughout the full area thereof, and with the corrugations extending in a direction substantially perpendicular to the direction of the fold lines and with the corrugations of adjacent layers being generally aligned in a mirror image with respect to each other, note FIG. 5. A corrugated medium of this type, and a method of manufacturing the same, is further disclosed in the U.S. Pat. No. 3,540,079 to Bush. Also, the illustrated pack 22 includes a pair of spacers 30 disposed between the folded layers of the pack on each end face of the filter to maintain the straight alignment of the layers.

A relatively thin and lightweight four sided peripheral frame 32 surrounds and supports the filter pack, with the four sides 34, 35, 36, 37 of the frame overlying and covering the opposite side edges 25, 26 and opposite end edges 27, 28 of the pack respectively. The frame 32 is composed of a relatively hard, air impermeable molded material, such as plastic or fiberglass, which is selfbonded and sealed to the filter medium over substantially the entire interfacing area to effectively preclude the leakage of air therebetween. As best seen in FIG. 5, the four sides each include integral reinforcing ribs 40, 41 extending across the interior surface of the frame sides, with the ribs 40 being formed between the adjacent spaced apart portions of adjacent medium layers 23 at the side edges 25, 26 of the pack, and the ribs 41 being defined by and substantially filling the corrugations on the end edges 27, 28 of the pack. As noted above, these reinforcing ribs act to provide substantial strength to the frame along the direction thereof, i.e., along a direction extending between the opposite end faces of the filter, and they permit the frame to be clamped against a pressure sealing gasket or the like, while permitting the frame to be otherwise extremely thin and lightweight. In this regard, the thickness of the frame is typically not greater than about ⅛ inch at a point between the adjacent ribs.

The frame 32 is fabricated by the method schematically illustrated in FIGS. 2-4, and which includes initially folding the sheet of filtering medium upon itself in accordion fashion to form the pack 22 as described above. If desired, a pair of spacers 30 may then be mounted between the layers on each end face of the filter. Next, a moldable liquid 44 which is adapted to set and form the relatively hard, air impermeable frame and self-bond and seal to the filtering medium, is then deposited in a thin layer (e.g. about ¼ inch deep) in a generally flat, horizontally disposed rectangular mold 45. The mold 45 as illustrated includes a pair of raised, narrow flat surfaces 46 along each side edge, and a pair of centrally located and spaced apart channels 47 for the purposes described below. The mold is sized to generally conform to the rectangular outline of at least the two opposite edges 25, 26 of the pack. The pack is then positioned into the mold utilizing a suitable retaining member 49, and so that the edge 26 is immmersed in the liquid 44. The retaining member 49 is designed to hold the pack 22 under a compressive force which is directed between the end edges 27, 28 of the pack, and as indicated by the arrows F in FIG. 3. This compressive force is designed to assist in preventing the layers of the pack in the finished filter from laterally shifting during normal use. The liquid 44 is then permitted to set to thereby form a relatively hard, air impermeable frame side 35 which is self-bonded and sealed to the edge 26 of the pack. The above process is then repeated to form the opposite side 34 and thereby form an intermediate product 20a having frame sides 34, 35 on the opposite edges and as seen in FIG. 4.

The intermediate product 20a is then held by a second retaining member 49a. The thusly held product 20a is then deposited in the filled mold 45 to form the third side 36, which is self-bonded and sealed to the previously formed sides 34, 35 at the two corners. The process is repeated to form the fourth side 37 and thereby complete the fabrication of the filter 20.

Viewing FIG. 5, it will be seen that during formation of the sides 34 and 35, the moldable liquid 44 flows between the adjacent spaced apart portions of the adjacent folded layers of the medium, to thereby form the ribs 40. During the formation of the sides 36 and 37, the liquid flows into the corrugations of the medium to form the integral reinforcing ribs 41. Thus each of the four frame sides includes a plurality of closely spaced parallel ribs which impart substantial strength along the direction thereof. The raised edge surfaces 46 in the mold 45 form a ledge 51 of reduced thickness along each edge of each frame side, with the ledges defining an adjacent shoulder 52, note FIG. 1. Also, the channels 47 in the bottom of the mold 45 form reinforcing external ridges 53 on the sides of the frame.

Figure 7:
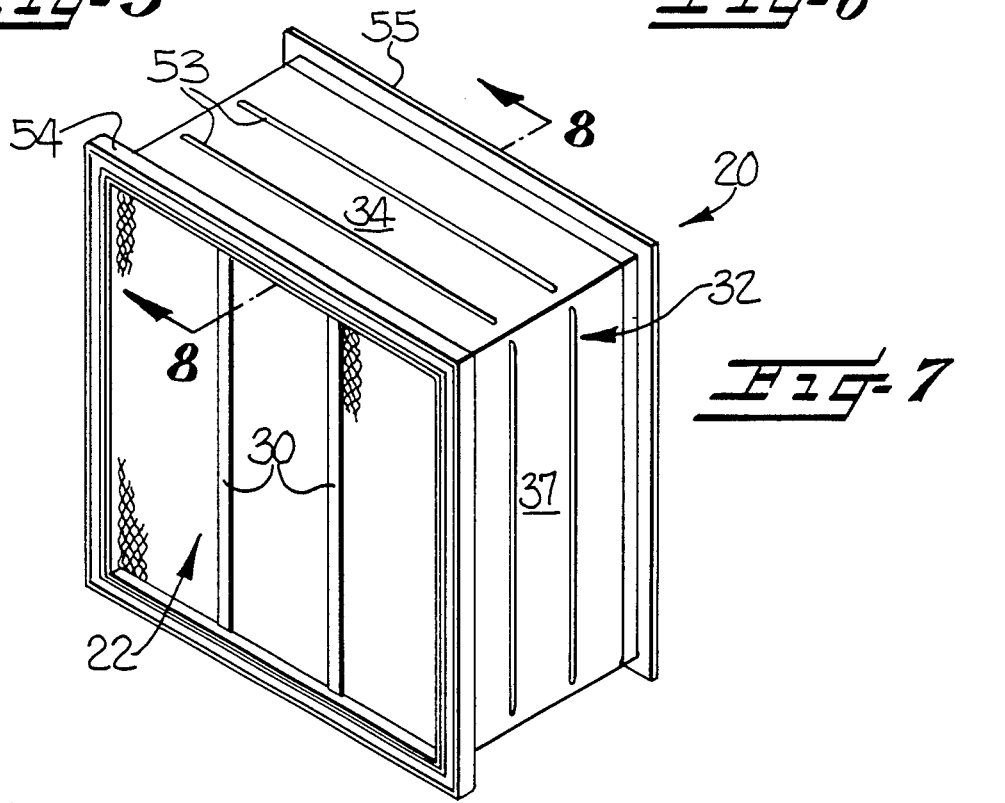
FIG. 7 is a perspective view of the filter shown in FIG. 1, and which further includes a header positioned about the frame at each end thereof.
Figure 8:
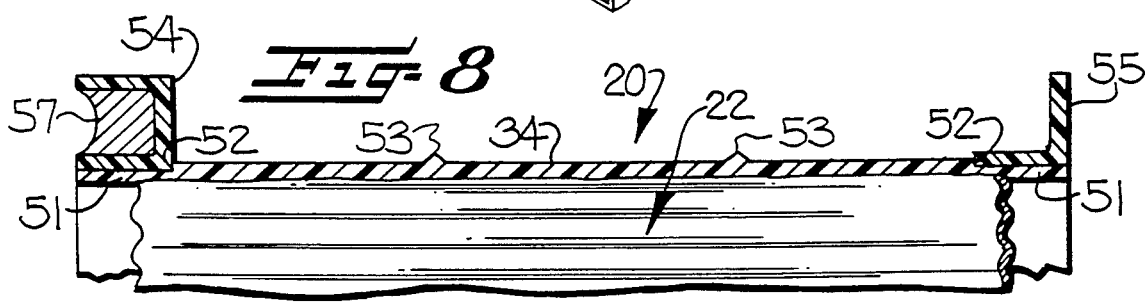
FIG. 8 is a fragmentary sectional view of the frame and two headers of the filter shown in FIG. 7, and taken subtantially along the line 8—8 thereof.

The resulting filter 20 constitutes a basic or universal cartridge which may be manufactured in large numbers, held in inventory, and subsequently formed into a desired specific configuration suitable for mounting in a housing or the like, by the placement of any one of a number of differently designed headers about the outer periphery thereof, and as orders are received. For example, the filter 20 may be modified by the addition of two headers 54, 55 at the ends of the filter as seen in FIGS. 7 and 8, with the header 54 being in the form of a continuous forwardly facing channel mounting a sealing fluid 57 of the type disclosed in U.S. Pat. No. Re 27,701 to Allan et al, and the header 55 comprises a continuous L-shaped bracket. Each header 54, 55 is seated on the associated ledge 51 formed on the exterior of the frame, and abuts the shoulder 52. Further, each header is preferably sealed to the exterior of the frame by the use of a suitable adhesive.

FIGS. 9–19 illustrate further specific header configurations which may be assembled to the basic filter 20. Specifically, FIGS. 9–15 illustrate various orientations of the fluid filled channel header 54 or bracket header 55, with FIG. 14 illustrating a pressure sealing gasket 57a of conventional design mounted to the header 55. FIGS. 16–18 illustrate a header 58 in the form of a peripheral skirt which is adapted to engage a sealing fluid positioned in a separate channel in the housing, and in the manner further described in U.S. Pat. No. 3,486,311 to Allan. FIG. 19 discloses a header 59 in the form of a transition to a circular duct. As will be apparent, many other header configurations are possible.

In view of the compressive force F which is applied to the pack 22 during its method of manufacture as described above, it will be appreciated that the pack tends to exert an oppositely directed force against the sides of the frame 32. In addition, the extremely thin sides 34–37 usually have insufficient strength and rigidity to resist outward bulging, which of course would render the filter unsuitable for many applications, such as where the filter is to be sealably mounted in a close fitting housing. It has been found however, that where a continuous, relatively rigid metal or plastic header is positioned about the exterior of the frame as described above, the header acts to gird the frame and effectively preclude undesirable bulging. Of course, this resistance to bulging is enhanced by the use of two headers as shown for example in the illustrated specific embodiments.

FIGS. 20 and 21 illustrate a further embodiment of the present invention, and wherein the filter pack 22a comprises a flat sheet of filtering media 21a which is folded upon itself, and with corrugated metal, paper, or plastic separators 60 positioned between the folds. The frame 32a is formed about the pack 22a in a manner similar to that described above. However, the different construction of the pack will result in reinforcing ribs 40a being formed only on the sides 34a, 35a of the frame which overlie the opposite side edges of the pack, and as seen in FIG. 20. Specifically, the settable liquid will flow into the space defined by each adjacent pair of medium layers and the associated separator 60. The sides 37a, 38a along the end edges of the pack will be substantially planar, in view of the flat nature of the medium sheet.

In many applications, it is desirable to mount a protective fabric scrim 62 across one or both end faces of the filter, to cover and protect the pack 22 from damage resulting from contact with foreign objects during handling, or while in use, note FIGS. 22–25. In accordance with the present invention, such scrim 62 may be readily assembled to the filter 20, by securing the scrim between the outer surface of the frame and a header. As seen in FIGS. 23 and 24, the mounting structure may include mating notches in the frame 32 and header 54 which define a receptacle, and into which the scrim may be inserted and held by a rubber ring 64. Alternatively, the scrim may be assembled by draping it over the end of the frame, and sealably assemblying the header 54 thereover, note FIG. 25.

The frame 32 of the filter 20 may be molded from a variety of conventional moldable materials which are adapted to set and form a relatively hard, air impermeable crust-like sheet. Further, a moldable material preferably should be selected which has the characteristic of penetrating and diffusing into the filter medium which is immersed in the liquid during the molding process, to enhance the bond and seal therebetween, and in the manner schematically illustrated in FIG. 3 at 66. Various synthetic resins, such as fiberglass and plastics, are commercially available which possess the above characteristics with respect to conventional glass fiber high efficiency particulate air filtering medium, and are suitable for use with the present invention. One preferred moldable material is urethane plastic.

The thin, lightweight nature of the frame, as well as its composition, materially facilitates the disposability of the filter of the present invention after its use, by any one of several possible procedures. For example, the entire filter may be crushed or compacted relatively easily to reduce its volume, and the compacted residue may, if desired, be then encapsulated in glass by a vitrification process to further facilitate its handling. Where metal headers are employed, such headers may be initially removed and detoxified in many instances, to further enhance the crushability and disposability of the remaining portion of the filter, and with the metal headers then being reusable. It is also possible to reduce the volume of the present filter, or at least substantial portions thereof, by a shredding operation prior to compaction, or to incinerate or chemically digest the filter.

In the drawings and specification, there has been set forth preferred embodiments of the invention, and although specific terms are employed, they are used in a generic and descriptive sense only and not for purposes of limitation.

That which is claimed is:

1. A high efficiency particulate air filter which is characterized by being lightweight and readily disposable after use, and comprising
   a sheet of high efficiency particulate air filtering medium folded upon itself in accordion fashion to form a generally rectangular filter pack which includes opposite side edges defined by the edges of the folded sheet and opposite end edges defined by the ends of the sheet,
   a relatively thin and lightweight four sided peripheral frame surrounding and supporting said filter pack, with the four sides of said frame being separately molded and overlying and covering respective ones of said opposite side edges and opposite end edges of said pack, said frame being composed of a relatively thin, hard, air impermeable material which is self-bonded and sealed to said filter medium over substantially the entire interface between said medium and said frame to effectively preclude the leakage of air therebetween, and with adjacent edges of adjacent sides of said frame being self-bonded to each other, said frame further having an exterior surface which includes a peripheral shoulder formed in said exterior surface adjacent at least one end of said filter to define a peripheral ledge thereabout, and
   at least one separate header surrounding and sealably secured to the external periphery of said frame, with said one header being mounted upon said ledge in abutting relation with the associated shoulder.

2. The high efficiency particulate air filter as defined in claim 1 wherein said exterior surface of said frame includes a second peripheral shoulder adjacent the other end of said filter, with said second shoulder defining a second peripheral ledge about said other end of said filter, with each of said first mentioned and second peripheral ledges having a reduced thickness, and further comprising a second separate header surrounding and sealably secured to the external periphery of said frame, with said second header being mounted upon said second ledge in abutting relation with the associated shoulder.

3. The high efficiency air filter as defined in claim 2 wherein at least one of said headers mounts a sealing medium for sealably engaging a mating component in a filter housing or the like.

4. The high efficiency air filter as defined in claim 1 and further comprising a protective scrim fabric overlying one end face of the filter and being secured about the entire periphery of the frame at the interface between the exterior surface of the frame and said one header.

5. The high efficiency particulate air filter as defined in claim 1 wherein said frame material is diffused into said filtering medium over substantially the entirety of said interface to enhance the bond and seal therebetween.

6. The high efficiency particulate air filter as defined in claim 1 wherein said filter pack is composed of generally parallel layers and with adjacent layers being interconnected by transverse fold lines, wherein said sheet includes longitudinal corrugations throughout the full area thereof and with the corrugations extending in a direction substantially perpendicular to the direction of said fold lines and with the corrugations of adjacent layers being generally aligned in a mirror image with respect to each other, and wherein said four sides of said peripheral frame each include integral reinforcing ribs extending across the interior surface of the frame side, with said ribs being defined by and substantially filling the corrugations on said end edges of said pack and the adjacent spaced apart portions of adjacent layers on the opposite side edges of the pack.

7. The high efficiency particulate air filter as defined in claim 1 wherein said filter pack is under a compressive force along a direction extending between the opposite end edges and such that the pack tends to naturally expand outwardly along such direction, and wherein said header has sufficient rigidity to gird the frame and effectively prevent any tendency of the frame to bulge outwardly from the outward force exerted by the filter pack.

* * * * *